(12) United States Patent
Napierala et al.

(10) Patent No.: US 7,561,262 B2
(45) Date of Patent: Jul. 14, 2009

(54) LATERAL AND LONGITUDINAL METROLOGY SYSTEM

(75) Inventors: Bruno Napierala, Le Cannet (FR); Cyril Degrelle, Mandelieu (FR); Xavier Leyre, Opio (FR); Suzanne Abadie, Cannes la Bocca (FR)

(73) Assignee: Thales (FR)

( * ) Notice: Subject to any disclaimer, the term of this patent is extended or adjusted under 35 U.S.C. 154(b) by 0 days.

(21) Appl. No.: 11/769,484

(22) Filed: Jun. 27, 2007

(65) Prior Publication Data

US 2008/0002191 A1   Jan. 3, 2008

(30) Foreign Application Priority Data

Jun. 27, 2006   (FR)   ................................ 06 52673

(51) Int. Cl.
*G01B 11/26* (2006.01)
(52) U.S. Cl. ................................ 356/139.03
(58) Field of Classification Search ....... 356/3.01–3.15, 356/4.01–4.1, 5.01–5.15, 6–22, 139.01–139.1
See application file for complete search history.

(56) References Cited

U.S. PATENT DOCUMENTS 4,867,560 A * 9/1989 Kunitsugu ............. 356/139.05

5,493,392 A    2/1996 Blackmon et al.
6,876,453 B2 * 4/2005 Van Doren et al. .......... 356/498
2003/0184729 A1 * 10/2003 Bowers ...................... 356/5.1

FOREIGN PATENT DOCUMENTS

WO    8702797    5/1987

OTHER PUBLICATIONS

Leyre, et al., "Recent Advances and Low Cost Concept for the Gamma-Ray Lens Project Max", Experimental Astronomy, vol. 20, pp. 455-464, Dec. 2005 (XP002422675).
Wielders, et al., "Metrology Concepts for a Space Interferometer Mission: Smart-2", Proceedings of the SPIE, vol. 4852, pp. 268-278, Feb. 2003 (XP002422676).

* cited by examiner

*Primary Examiner*—Thomas H Tarcza
*Assistant Examiner*—Luke D Ratcliffe
(74) *Attorney, Agent, or Firm*—Lowe Hauptman Ham & Berner, LLP

(57) ABSTRACT

The invention relates to a satellite metrology system for satellite formation flight comprising at least one reference satellite (SR) and one secondary satellite (SS). In the reference satellite, an optical source (SO) emits a light beam intended to illuminate the secondary satellite (SS) and a set of light detectors (CCD) detects the light reflected by the secondary satellite. A measuring circuit (CI) is used for detecting the detector or detectors that receive the light from the secondary satellite. In the secondary satellite (SS) at least one reflector (RR1) receives the illumination light from the reference satellite and reflects it towards the set of detectors (CCD) of the reference satellite.

16 Claims, 5 Drawing Sheets

LATERAL AND LONGITUDINAL METROLOGY SYSTEM

RELATED APPLICATIONS

The present application is based on, and claims priority from, France Application Number 0652673, filed Jun. 27, 2006, the disclosure of which is hereby incorporated by reference herein in its entirety.

BACKGROUND OF THE INVENTION

The invention relates to a metrology system for satellites that can be used for satellite location and in particular a metrology system enabling satellites to be located with respect to one another. Such a system is especially applicable in satellite formation flight systems currently referred to in the art as "Free Flying".

The invention also relates to a control system that can be used to control the movement and orientation of a secondary satellite with respect to a reference satellite.

It is also applicable to a system for equalizing distances between satellites.

DESCRIPTION OF PRIOR ART

Some systems use several satellites that move coherently in relation to one another. This is the case for example, of a system of new generation high energy telescopes, in which light rays are concentrated with the aid of several satellites. These satellites must then preserve their relative positions with respect to one other, which may be controlled.

In a formation flight consisting of two satellites, one can be regarded as the "master" satellite or reference satellite, the other as the "slave" or secondary satellite. The reference satellite then controls the secondary satellite's movements according to its own movements.

The reference satellite includes trajectory tracking systems and constitutes the satellite on which the other satellites of the formation align themselves.

The secondary satellite or satellites include trajectory tracking means and therefore have means of propulsion and/or orientation.

Furthermore, for performing aperture synthesis interferometry, a formation flight of several satellites requires precise determination of their positions relative to a reference satellite. Determinations of lateral and longitudinal positioning are +/−10 µm at 100 m and +/−100 µm at 100 m respectively.

Aperture synthesis interferometry requires precise equalization of the distances between each secondary satellite and the reference satellite. Said equalization depends on the coherence length imposed by the spectral width (filtered or non-filtered) of the observed source. In general, the equalization required is on a nano-scale.

The currently known solutions like the use of a synthetic wavelength (beat between two neighbouring wavelengths) and laser telemetry are the subject of very complex onboard systems and do not offer the accuracy expected of telemetry.

The object of the invention is therefore to solve such a problem.

SUMMARY OF THE INVENTION

The invention thus relates to a satellite metrology system for satellite formation flight comprising at least one reference satellite and one secondary satellite. The reference satellite comprises:

- an optical source emitting a light beam for at least partly illuminating the secondary satellite,
- a main set of light detectors capable of detecting the light originating from the secondary satellite,
- a measuring circuit for detecting the detector or detectors that receive the light from the secondary satellite.

In addition, the secondary satellite includes at least one first reflector that receives the light received from the reference satellite and which reflects it towards the set of light detectors of the reference satellite.

Advantageously, the optical source emits a divergent light beam.

An output focusing lens will then be provided, the optical source being located at a distance equal to twice the focal distance of the lens.

According to a preferred embodiment of the invention, said reflector is a retroreflector.

Moreover, the invention provides that the main set of detectors is a detector matrix. This set of detectors includes a first nominal detector corresponding to the illumination point of the set of detectors when the secondary satellite is suitably positioned with respect to the reference satellite. The measuring circuit detects the distance separating said nominal detector from a detector illuminated by the light reflected by the secondary satellite, thus determining the lateral offset of the secondary satellite with respect to its nominal position.

According to another form of embodiment, the secondary satellite includes at least three reflectors, each of them intended to reflect the light originating from the optical source towards the main set of detectors of the reference satellite.

Preferably, the secondary satellite will be provided with a second, a third, a fourth and a fifth reflectors, each of them intended to reflect the light originating from the optical source towards the main set of detectors of the reference satellite.

Advantageously, said reflectors are located along the same plane. The second to fifth reflectors are then preferably distributed around the first reflector.

The optical source is preferably a laser source.

In such a metrology system thus comprising five reflectors, the main set of detectors then comprises a second, a third, a fourth and a fifth nominal detector each of whose positions corresponds to a point of illumination by a light beam reflected by one of the second to fifth reflectors when the secondary satellite is suitably oriented angularly in relation to the reference satellite. The measuring circuit then detects the distance separating each nominal detector from a detector illuminated by the light reflected by the corresponding reflector of the secondary satellite. Said measuring circuit thus determines the angular deviation of the secondary satellite in relation to its nominal position.

According to one form of embodiment, the reference satellite further possesses a first semi-reflecting device interposed between the optical source and the output lens for deflecting the light reflected by the secondary satellite towards the main set of detectors.

According to a variant embodiment, the reference satellite comprises a second semi-reflecting device arranged between the optical source and the first semi-reflecting device. An auxiliary set of detectors is thus capable of being illuminated by the light reflected by the secondary satellite. The measuring circuit can switch the detection of the distance separating the nominal detectors and the detectors illuminated by the light reflected by the secondary satellite, from the main set of detectors to the auxiliary set of detectors.

Advantageously, the invention provides for fitting the reflectors onto stable thermoelastic structures.

Furthermore, the invention provides for the reference satellite being able to include a clock together with a drift velocity calculation circuit receiving different distance measurements from the measuring circuit and calculating the drift velocity of the secondary satellite in relation to the reference satellite.

Similarly, the reference satellite may contain an acceleration calculation circuit receiving the drift velocities from the velocity calculation circuit, or different distance measurements from the measuring circuit and calculating the drift acceleration to which the secondary satellite is subject.

According to one advantageous form of embodiment, the second to fifth reflectors are arranged symmetrically around the first reflector and a sixth reflector is provided, associated for example with one of the second to fifth reflectors for determining the angular orientation of the secondary satellite.

Alternatively, according to a variant embodiment provision can be made for the second to fifth reflectors not being arranged symmetrically with respect to the first reflector.

The invention also relates to a satellite formation flight positioning control system applying the metrology system thus disclosed. The reference satellite then comprises a control unit:

for calculating the distances separating the nominal detectors from the areas of the set of detectors illuminated by the light reflected by the reflectors of the secondary satellite, calculating one or more control instructions for the orientation and movement of the secondary satellite, transmitting said control instruction to the secondary satellite, the latter containing control circuits for controlling actuators for the movement and orientation of the secondary satellite according to said control instructions.

The invention also relates to a system for equalizing distances between satellites applying the metrology system previously disclosed. In said equalization system, the reference satellite comprises:

an interferometric ring, a light source for injecting a light beam at an injection point of the interferometric ring, the latter enabling this light beam to be transmitted to two secondary satellites which retroreflect the light that they receive towards the interferometric ring, a detector coupled to an output of the interferometric ring, measuring the respective phases of the light beams reflected by the secondary satellites, two optical path equalization devices inserted in two arms of the interferometric ring which are located on each side of the injection point of the interferometric ring.

According to a preferred form of embodiment of such a system, the equalization devices each comprise a first reflection device inserting into the path of an arm of the interferometric ring, a second reflection device that is mobile with respect to the first device and enables light to be retroreflected towards the first reflection device.

BRIEF DESCRIPTION OF THE DRAWINGS

The various objects and characteristics of the invention will appear more clearly in the description that follows and in the accompanying figures which show.

DETAILED DESCRIPTION OF A PREFERRED EMBODIMENT

Figure 1:
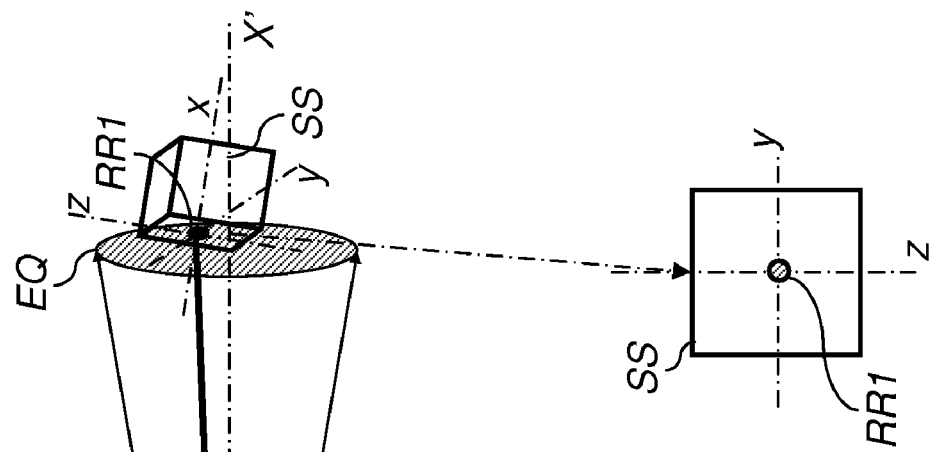
FIG. 1, an example of basic embodiment of a satellite metrology system for satellite formation flight, FIGS. 2a to 2c, a more complete example of embodiment of such a metrology system, FIG. 3, a variant embodiment of the system in FIGS. 2a to 2c, FIG. 4, another variant embodiment of the system according to the invention, FIG. 5, a control system applying the metrology system according to the invention, FIG. 6, an example of embodiment of a system for equalizing optical distances between satellites.
Figure 1:
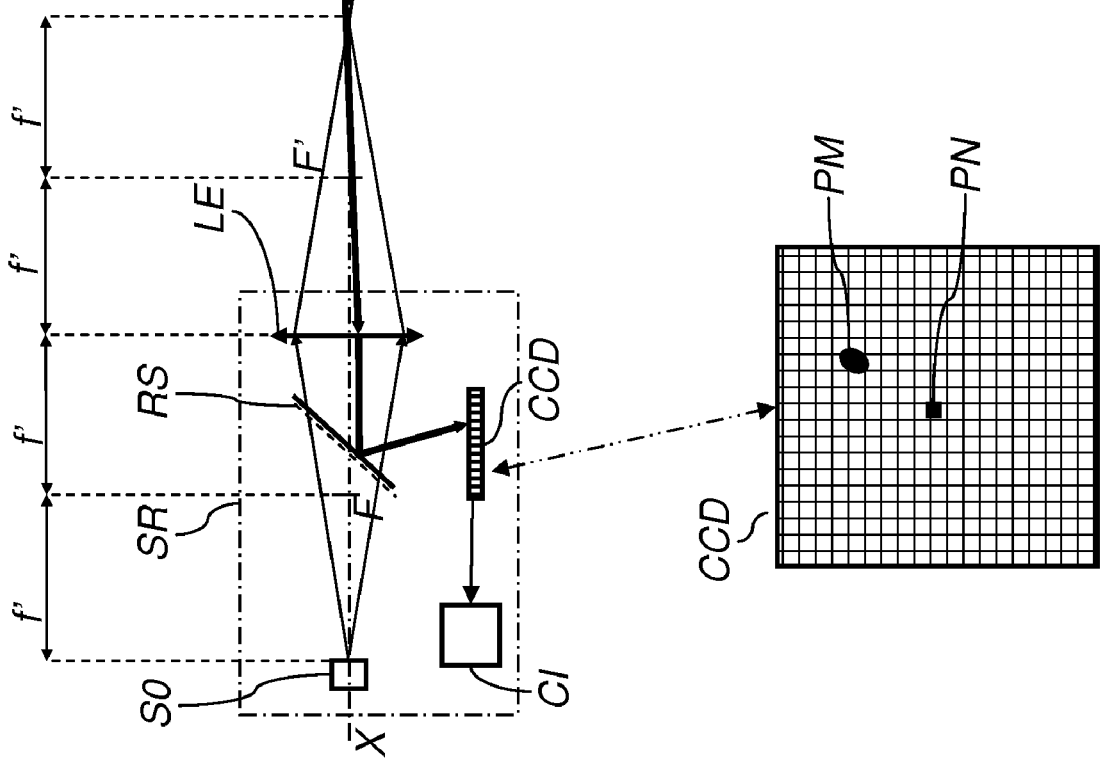

Referring to FIG. 1, a description will be given of an example of basic embodiment of a metrology system applicable to a satellite formation flight system.

By way of example, the invention is described considering the case of just two satellites, but the invention is applicable to a formation flight system comprising a greater number of satellites.

In FIG. 1, the reference satellite SR (master satellite) comprises an optical source SO capable of illuminating a face of the secondary satellite SS (slave satellite).

The illumination beam originating from the source SO is transmitted via a lens LE of focal distance f', located substantially at a distance $2f'$ from the source. The focal distance f' of the lens is calculated in such a way that the illumination beam aperture will be such that the section EQ of the beam will allow illumination of the face of the secondary satellite SS which is oriented towards the reference satellite. By way of example, the aperture angle of the illumination beam is 15°.

According to the invention, provision is also made for said face of the secondary satellite to have at least one reflection device RR1. All or part of the light from the illumination beam received by the reflector RR1 is reflected towards the reference satellite.

A semi-reflecting device RS is provided between the lens LE and the source SO, enabling the light reflected by the secondary satellite to be directed towards a set of detectors such as a detection matrix CCD.

The reflector RR1 occupies a well-defined space on the secondary satellite and this space is known to the reference satellite. For example, the reflector is at the centre of the face of the satellite SS illuminated by the illumination beam (see FIG. 1).

The beam reflected by the reflector RR1 illuminates a delimited area PM of the surface of the detection matrix CCD. Under these conditions, if in its normal position, the satellite SS has to be aligned along the axis XX' and in this position the reflected beam had to illuminate a detector PN, the reference satellite is capable of measuring the position of the satellite with respect to the axis X by determining the distance separating the detector PN from the illuminated area PM.

Then the corrective movements to be applied to the secondary satellite for finding a perfect lateral alignment will be determined by applying the formula:

$$(T_x, T_y) = \phi(X_{centroid}, Y_{centroid})$$

in which:

$T_x$: corrective along the X axis $T_y$: corrective along the Y axis $X_{centroid}$: X coordinate of the illuminated area PM (measurement)

$Y_{centroid}$: Y coordinate of the illuminated area PM (measurement)

$\phi$: refined linear function (calibration)

Advantageously, the invention provides that the reflector RR1 is a retroreflector so that it reflects the maximum light towards the detection matrix CCD.

Moreover, the light source will be preferably a laser source.

The system in FIG. 1 can therefore be used to measure the position of the secondary satellite SS with respect to the axis XX'.

Figure 2A:
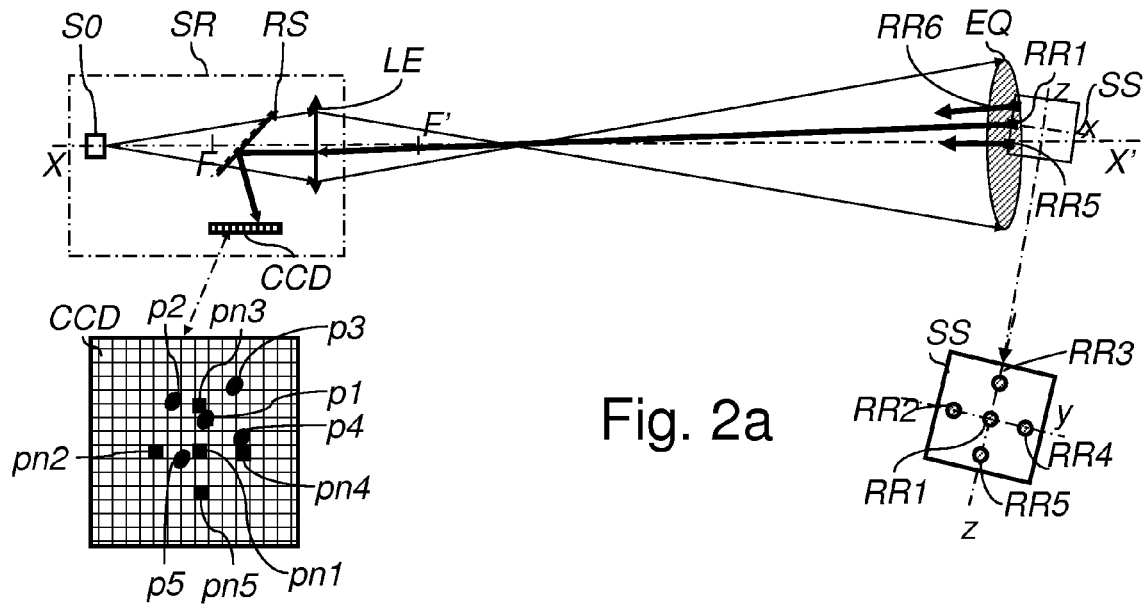
Figure 2B:
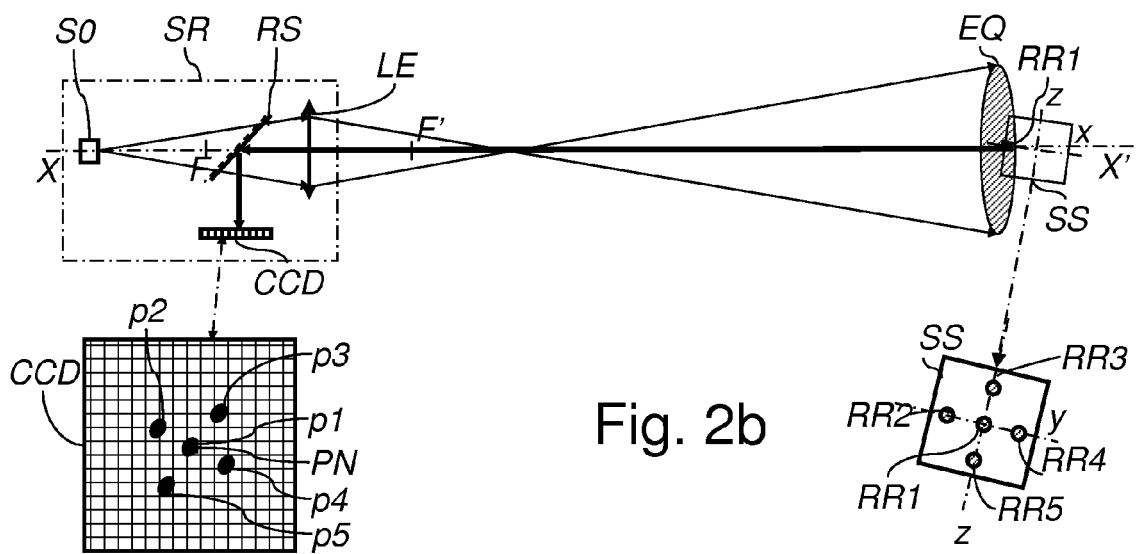
Figure 2C:
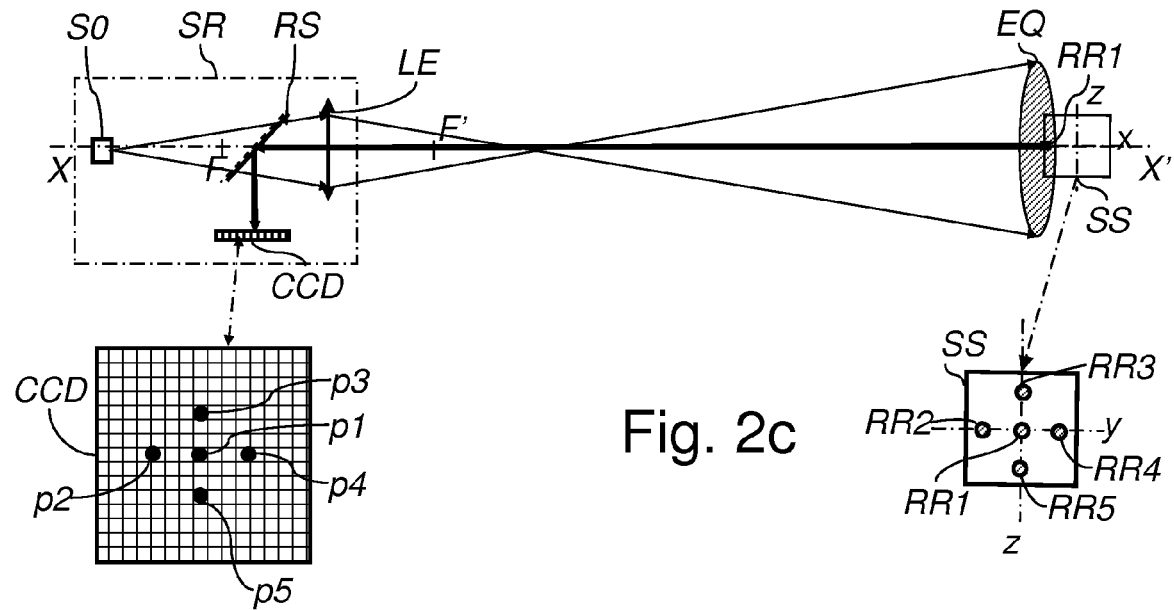

Referring to FIGS. 2a to 2c, the system will now be described such that it enables the satellite's inclination to be measured with respect to the axis XX' and its angular orientation around this axis.

For this, the face of the secondary satellite which is illuminated by the illumination beam coming from the reference satellite comprises four additional reflectors RR2, RR3, RR4, RR5 preferably arranged around the reflector RR1. These reflectors form, for example, a cross and are preferably placed along the same plane zy.

In FIG. 2a, the satellite SS is offset with respect to the axis XX' and the plane of the reflectors RR1 to RR5 is inclined with respect to the axis XX'. In addition, the secondary satellite assembly is offset angularly around the axis XX' as can be seen on the plan view of the reflectors (bottom right of FIG. 2a).

The light reflected (or retroreflected) by the reflectors (or retroreflectors) RR1, RR2, RR3, RR4, RR5 is retransmitted to the detection matrix CCD and gives rise to the illuminated areas p1, p2, p3, p4, and p5 respectively.

The lateral offset of the secondary satellite with respect to the axis XX' is measured, as described previously, by measuring the distance of the area p1 in relation to the nominal position pn1.

Then the three corrective rotations to be applied to the secondary satellite for finding a perfect attitude will be determined by applying the matrix formula:

$$\begin{pmatrix} \alpha \\ \beta \\ \gamma \end{pmatrix} = \begin{pmatrix} \varphi_1 \ (X_{centroids}, Y_{centroids}) \\ \varphi_2 \ (X_{centroids}, Y_{centroids}) \\ \varphi_3 \ (X_{centroids}, Y_{centroids}) \end{pmatrix}$$

in which:
α: corrective rotation along the X axis
β: corrective rotation along the Y axis
γ: corrective rotation along the Z axis
$X_{centroids}$: x coordinates of p2, p3, p4, p5 (measurements)
$Y_{centroids}$: Y coordinates of p2, p3, p4, p5 (measurements)
φ1, φ2, φ3: refined linear functions (calibration)

It should be noted that p1 then coincides with the detector pn1 as described previously.

Assuming that, according to this measurement, the secondary satellite SS is brought into alignment with the axis XX', we would obtain the situation shown in FIG. 2b.

It is then possible to identify the respective positions of the illuminated areas p2 to p5 and to measure their distances in relation to the nominal positions that they should have if the secondary satellite is properly oriented. These nominal positions np1 to np5 are shown in FIG. 2a. FIG. 2c shows the system when the position of the secondary satellite has been corrected.

In the system in FIGS. 2a to 2c, five reflectors have been provided, but without going outside the scope of the invention, such a system could operate with just three reflectors suitably positioned.

Figure 3:
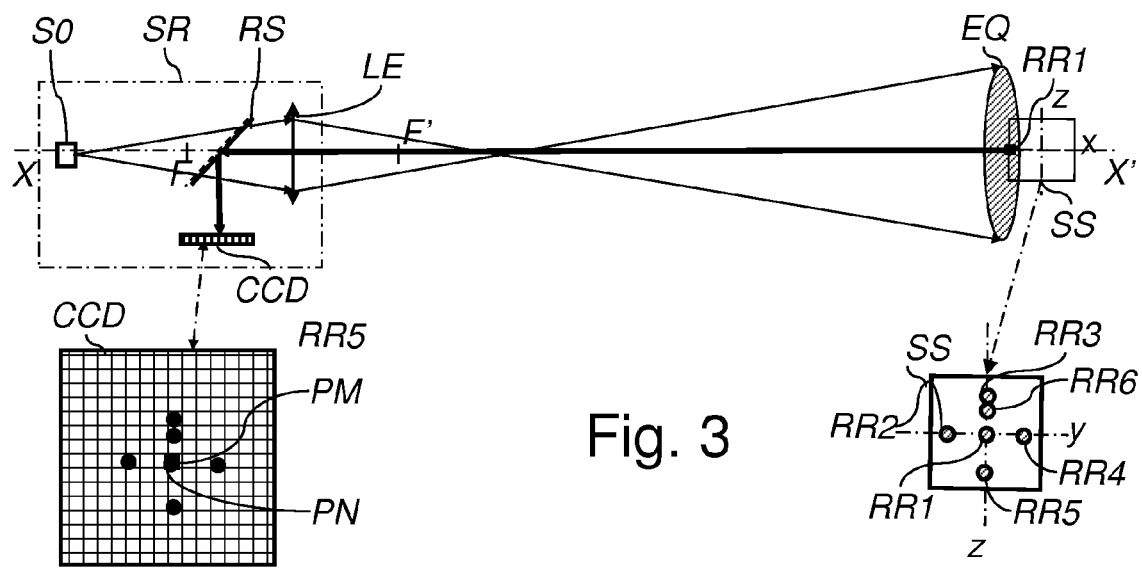

FIG. 3 shows a variant embodiment in which an additional reflector RR6 is provided, associated with one of the reflectors (the reflector RR3 in FIG. 3). This reflector gives an illuminated area p6 which, associated with the area p3 enables the easy angular orientation of the secondary satellite.

Figure 4:
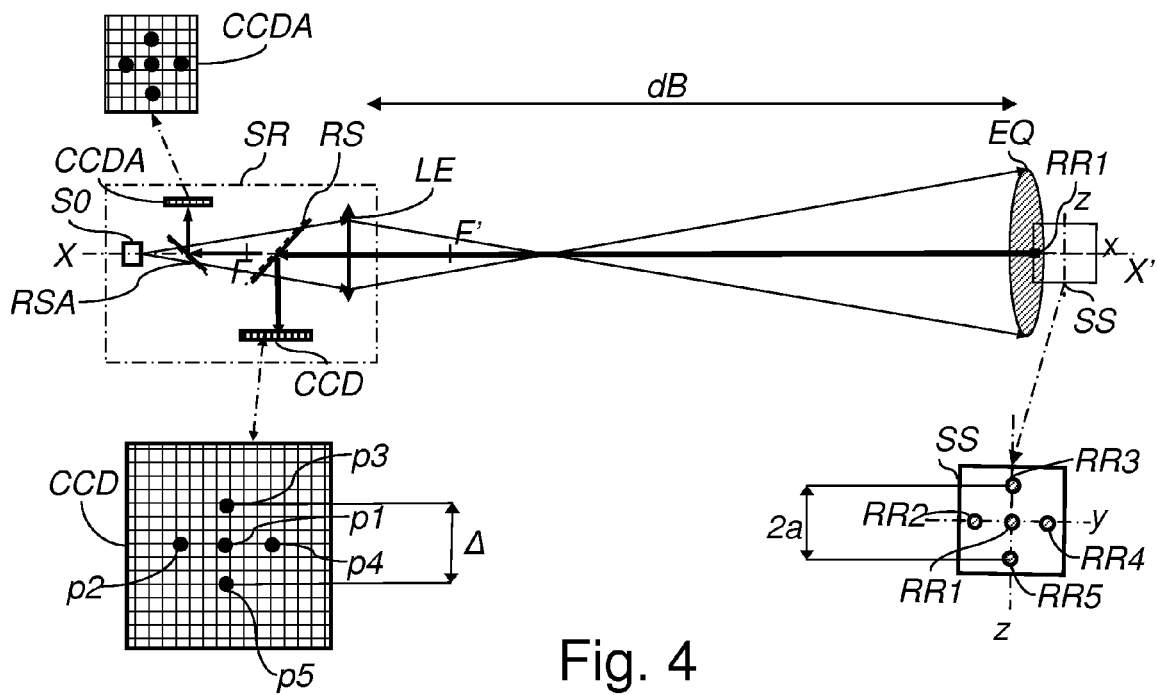

FIG. 4 shows a variant embodiment in which an auxiliary detection matrix CCDA has been provided, which receives, via the semi-reflecting device RSA, a part of the light reflected by the reflectors of the secondary satellite.

The detection matrix CCD can be used to measure the lateral and angular offsets when these are relatively large. Subsequently, when the position and orientation of the secondary satellite have been partially corrected, the system can operate with the auxiliary detection matrix CCDA, which is smaller in size and enables faster scanning of the matrix and therefore faster operation.

Figure 5:
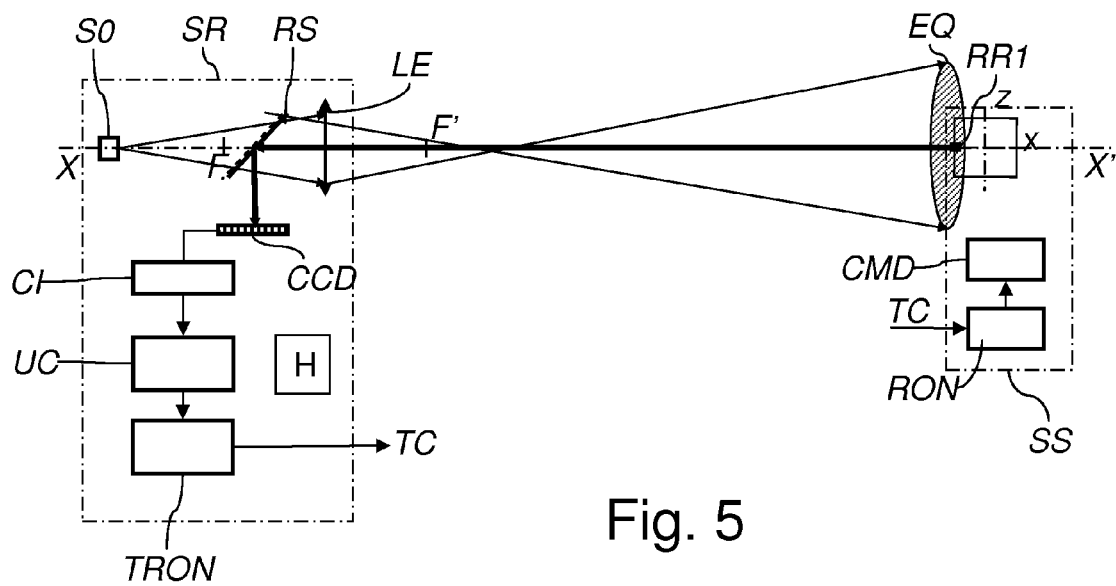

FIG. 5 shows a control system enabling the reference satellite to control the secondary satellite with the aid of the results of the measurements carried out with the system in FIGS. 1 to 4.

The reference satellite SR has a control unit UC receiving the detection matrix information from a measuring circuit CI (or detection matrix scanning circuit). The control unit UC can thus identify the positions of the illuminated areas (p1 to p5) and calculate their offset in relation to their respective nominal positions. The control unit calculates correction instructions TC, which are transmitted via a transmission circuit TRON to a reception circuit RON of the secondary satellite.

In the secondary satellite, the reception circuit RON communicates the instructions received to one or more control circuits CMD which control actuators for changing the position and/or the orientation of the secondary satellite.

The measuring system of the invention is thus based on the distance measurement between different image spots (centroiding) supplied by a network of retroreflectors placed on the secondary satellite and illuminated by a divergent laser beam originating from the reference satellite.

The position of the centroid originating from the central retroreflector (geometric centre of the network) provides the lateral determination.

In addition, the peripheral intercentroid distance measurements (p2 to p5) can be used to calculate the distance from the secondary satellite to the reference satellite by applying the formula:

$$d_B = f' \left( 1 + \frac{2a}{\Delta Y} \right)$$

In which:
$d_B$ is the distance between the reference satellite (plane of the lens LE) and the secondary satellite,
f' is the focal distance of the lens LE,
2a is the distance separating two reflectors (RR3 and RR5 for example in FIG. 2c)
Δ is the measured distance separating two nominal positions corresponding to these reflectors (pn3 and pn5 for example).

In the preceding disclosure, a step of lateral centring of the secondary satellite was performed so as to bring the illumination area PM onto the detector PN (see FIG. 1). However, without going outside the scope of the invention, the basic distance $d_B$ can be estimated without going through a first step of lateral centring (PM in PN). The offset can then easily be compensated analytically by a more generalized formula.

Moreover, the inventive system aboard a satellite offers a redundancy facility by inserting two additional semi-reflecting strips for positioning another optical source and also another set of detectors. Thus, in the event of failure of one of these two active components on its own, the metrological function remains fully retained.

Furthermore, a clock H provided in the reference satellite enables the control unit UC to calculate the velocity of movement of the secondary satellite with respect to the reference satellite (or even its acceleration) by making several measurements spaced out over time.

In some systems, it is necessary to equalize the optical distances between different satellites with very great accuracy. This is imperative, for example in interferometry systems where the accuracy of distance equalization must be of the order of a nanometer.

According to the invention, for equalizing the distances between a reference satellite and secondary satellites, provision is made for equalizing the optical paths, in pairs, of a Michelson interferometer used in white light.

Figure 6:
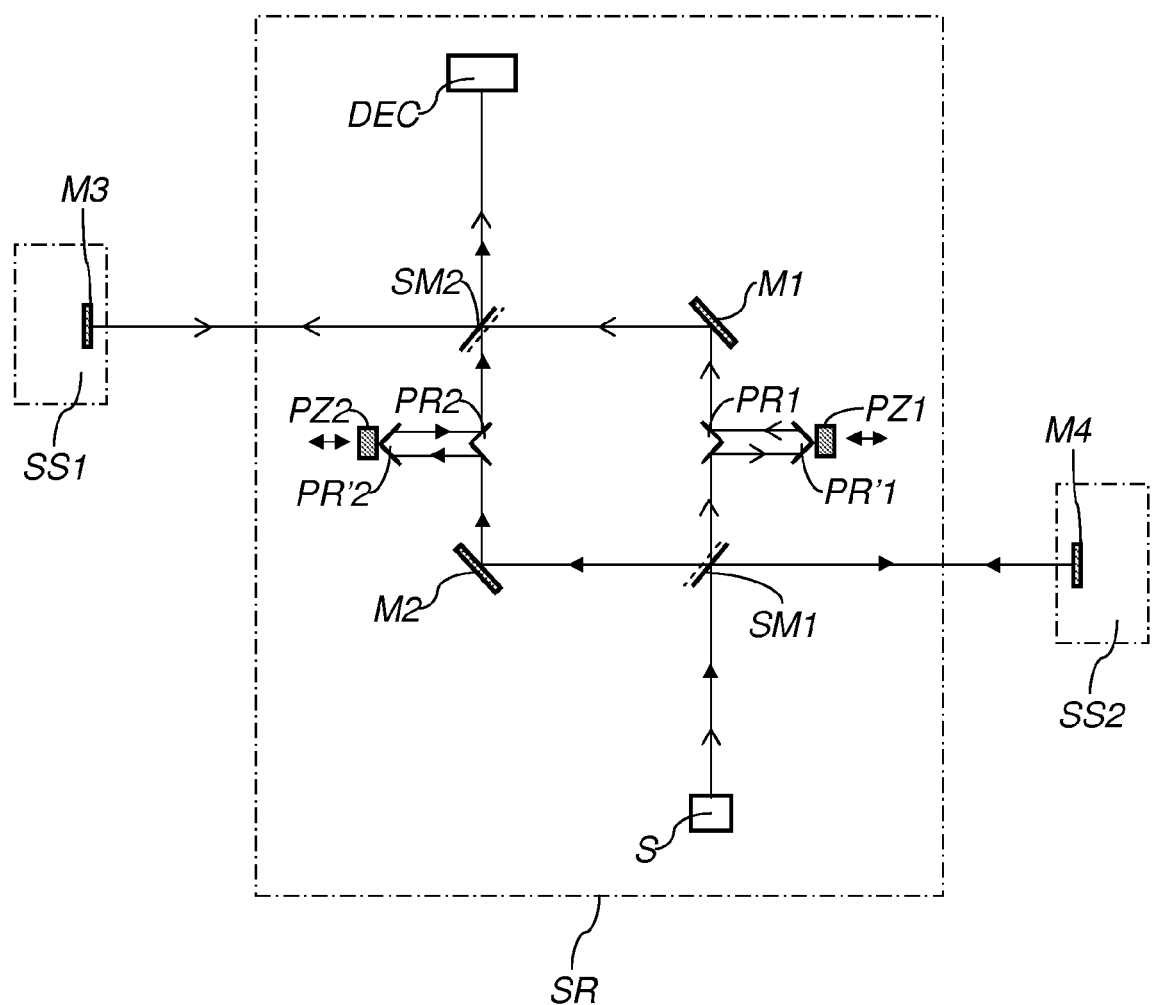

FIG. 6 shows such a system in which the reference satellite SR comprises a Michelson interferometer made with two semi-reflecting mirrors SM1 and SM2 and two mirrors M1 and M2.

This system enables the optical distances between two secondary satellites SS1 and SS2 and the reference satellite SR, to be equalized. The light path relating to the secondary satellite SS1 is indicated by thin-lined arrows and the light path relating to the secondary satellite SS2 is indicated by black triangles.

The semi-reflecting mirror SM1 enables a beam of white light supplied by a light source S, to be injected into the interferometric ring.

Optical path equalization devices are provided in two interferometer arms located on each side of this semi-reflecting mirror SM1.

As an example of embodiment, said equalization devices each include a first reflection device PR1, PR2 (cube corners for example) in cut into an arm of the interferometer. The reflection devices PR1 and PR2 reflect the light towards second reflection devices PR'1 and PR'2 which reflect the light towards the reflection devices PR1 and PR2 which reinsert the light into the interferometer. The distances between the devices PR1 and PR'1 on the one hand and between PR2 and PR'2 on the other, are separately adjustable by movement of the devices PR'1 and PR'2. For this, the reflection devices PR'1 and PR'2 are mounted on piezoelectric devices for moving the devices PR'1 and PR'2 with respect to the devices PR1 and PR2.

A detector DEC is used to detect the phasing of the light transmitted to the two secondary satellites SS1 and SS2. The actuation of the piezoelectric devices PZ1 and PZ2 is used to control this phasing and thus control the optical path lengths between the reference satellite and the secondary satellites.

It is seen therefore that the difference of distances is precisely determined by conventional delay lines (piezoelectric controlled movable cube corner) which enable the centring of the white fringe (bright fringe) and therefore the longitudinal corrective movement to be imposed on the secondary satellites for achieving this precise equalization.

The invention claimed is:

1. A satellite metrology system for satellite formation flight comprising:
    at least one reference satellite and one secondary satellite wherein the reference satellite comprises:
    an optical source emitting a divergent light beam for at least partly illuminating the secondary satellite, transmitted via a lens;
    a main set of light detectors capable of detecting the light originating from the secondary satellite;
    a measuring circuit for detecting the detector or detectors that receive the light from the secondary satellite;
    wherein
    the secondary satellite includes at least one first reflector, which is a retroreflector, receiving the light received from the reference satellite and reflecting the light towards the set of light detectors of the reference satellite, and wherein the lens is an output focusing lens, the reference satellite possessing a first semi-reflecting device interposed between the optical source and the output lens for deflecting the light reflected by the secondary satellite towards the main set of detectors;
    the optical source is located at a distance equal to twice the focal distance of the lens; and
    the main set of light detectors is a detector matrix including a first nominal detector corresponding to the illumination point of the set of detectors when the secondary satellite is suitably positioned laterally with respect to the reference satellite and wherein the measuring circuit detects the distance separating said nominal detector from a detector illuminated by the light reflected by the secondary satellite, thus determining the lateral offset of the secondary satellite with respect to its nominal position.

2. The satellite metrology system as claimed in claim 1, wherein the secondary satellite includes at least three reflectors, each of the reflectors intended to reflect the light originating from the optical source towards the main set of detectors of the reference satellite.

3. The satellite metrology system as claimed in claim 2, wherein the secondary satellite comprises a second, a third, a fourth and a fifth reflector, each intended to reflect the light originating from the optical source towards the main set of detectors of the reference satellite.

4. The satellite metrology system as claimed in claim 3, wherein said reflectors are located along the same plane, the second to fifth reflectors being distributed around the first reflector.

5. The satellite metrology system as claimed in claim 1, wherein the optical source is a laser source.

6. The satellite metrology system as claimed in claim 3, wherein:
    the main set of detectors comprises a second, a third, a fourth and a fifth nominal detector each of whose position corresponds to a point of illumination by a light beam reflected by one of the second to fifth reflectors when the secondary satellite is suitably oriented angularly in relation to the reference satellite; and
    in that the measuring circuit detects the distance separating each nominal detector from a detector illuminated by the light reflected by the corresponding reflector of the secondary satellite, said circuit thus determining the angular deviation of the secondary satellite with respect to its nominal position.

7. The satellite metrology system as claimed in claim 1, comprising a second semi-reflecting device arranged between the optical source and the first semi-reflecting device, an auxiliary set of detectors capable of being illuminated by the light reflected by the secondary satellite, the measuring circuit switching the detection of the distance separating the nominal detectors and the detectors illuminated by the light reflected by the secondary satellite, from the main set of detectors to the auxiliary set of detectors.

8. The satellite metrology system as claimed in claim 1, wherein the at least one reflector is fitted onto a stable thermoelastic structure.

9. The satellite metrology system as claimed in claim 1, including a clock together with a drift velocity calculation circuit receiving different distance measurements from the measuring circuit and calculating the drift velocity of the secondary satellite in relation to the reference satellite.

10. The satellite metrology system as claimed in claim 9, including a acceleration calculation circuit receiving the drift velocities from the velocity calculation circuit, or different distance measurements from the measuring circuit and calculating the drift acceleration to which the secondary satellite is subject.

11. The satellite metrology system as claimed in claim 6, wherein the second to fifth reflectors are arranged symmetrically around the first reflector and including a sixth reflector associated with one of the second to fifth reflectors for determining the angular orientation of the secondary satellite.

12. The satellite metrology system as claimed in claim 6, wherein the second to fifth reflectors are not arranged symmetrically with respect to the first reflector.

13. A satellite formation flight positioning control system applying the satellite metrology system as claimed in claim 1, wherein the at least one reference satellite comprises a control unit:
for calculating the distances separating the nominal detectors from the areas of the set of detectors illuminated by the light reflected by the reflectors of the secondary satellite,
calculating one or more control instructions for the orientation and movement of the secondary satellite,
transmitting said control instruction to the secondary satellite, the latter containing control circuits for controlling actuators for the movement and orientation of the secondary satellite according to said control instructions.

14. A system for equalizing distances between satellites applying the satellite metrology system as claimed in claim 12, wherein the reference satellite comprises:
an interferometric ring;
a light source for injecting a light beam at an injection point of the interferometric ring, the latter enabling this light beam to be transmitted to two secondary satellites which retroreflect the light that they receive towards the interferometric ring;
a detector coupled to an output of the interferometric ring, measuring the respective phases of the light beams reflected by the secondary satellites;
two optical path equalization devices inserted in two arms of the interferometric ring which are located on each side of the injection point of the interferometric ring.

15. A system of equalization as claimed in claim 14, wherein the equalization devices each comprise a first reflection device inserting into the path of an arm of the interferometric ring, a second reflection device that is mobile with respect to the first reflection device and enables light to be retroreflected towards the first reflection device.

16. A system for equalizing distances between satellites applying the satellite metrology system as claimed in claim 13, wherein the at least one reference satellite comprises:
an interferometric ring;
a light source for injecting a light beam at an injection point of the interferometric ring, the latter enabling this light beam to be transmitted to two secondary satellites which retroreflect the light that they receive towards the interferometric ring;
a detector coupled to an output of the interferometric ring, measuring the respective phases of the light beams reflected by the secondary satellites;
two optical path equalization devices inserted in two arms of the interferometric ring which are located on each side of the injection point of the interferometric ring.

* * * * *